July 6, 1926.  1,591,780
R. A. RICKETTS ET AL
BRAKE MECHANISM
Filed August 5, 1925
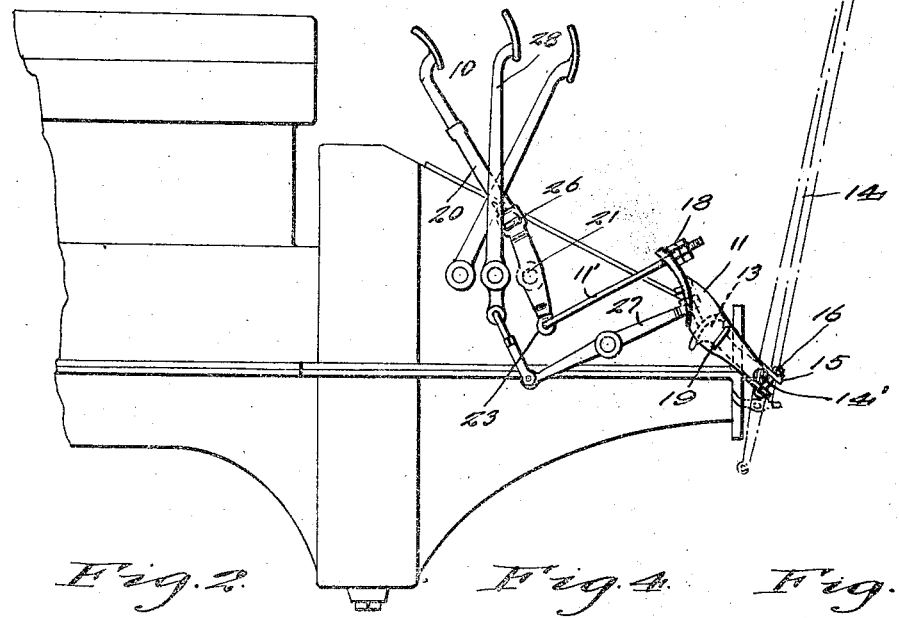
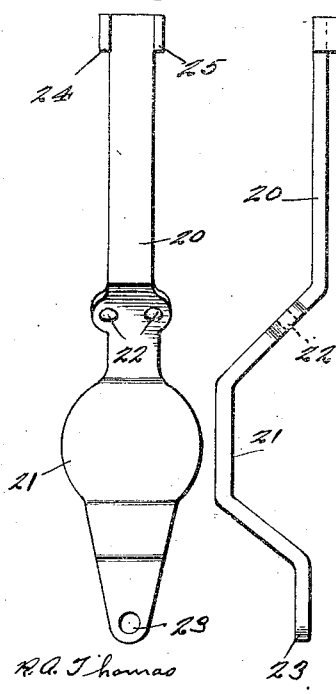
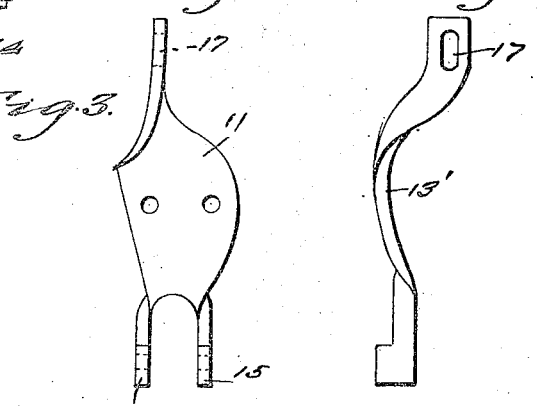
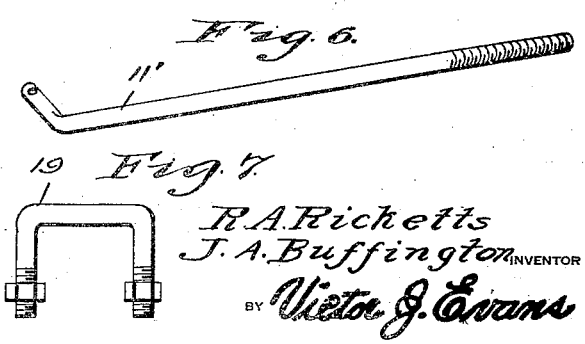
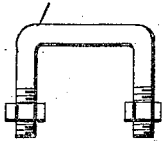
R. A. Ricketts
J. A. Buffington INVENTOR
BY Victor J. Evans
ATTORNEY Patented July 6, 1926.

1,591,780

UNITED STATES PATENT OFFICE.

ROBERT A. RICKETTS AND JOE A. BUFFINGTON, OF ZEARING, IOWA.

BRAKE MECHANISM.

Application filed August 5, 1925. Serial No. 48,342.

The object of this invention is to provide special means for operating the foot brake of a Ford type car simultaneously with the operation of the hand lever.

A further object is to provide connecting means between the hand lever and the foot brake pedal, which may be attached without expert assistance and which will supplement the present brake equipment without interfering therewith.

A further object is to provide a more positive braking effect, in one operation, and without causing any undesirable effect.

With the foregoing and other objects in view, the invention consists in the novel construction and arrangement of elements described, illustrated and claimed, it being understood that modifications may be made within the scope of the claims without departing from the spirit of the invention.

In the drawings forming part of this application:

Figure 1 is a view in side elevation showing the usual pedals of a Ford type car, with the hand lever and associated mechanism, including the special connection herein disclosed.

Figure 2 is a side elevation of an element to be applied to the foot pedal controlling the brake on the transmission.

Figure 3 is an edge elevation of the same element.

Figures 4 and 5 are views in elevation showing a bracket or the like to be made rigid with reference to the control shaft operated by the emergency hand lever.

Figure 6 is a perspective view of a rod adapted to be passed through the slotted portion of the bracket of Figures 4 and 5 and to transmit movement to the foot brake pedal when the hand lever is thrown.

Figure 7 shows a U-bolt adapted to connect the elements of the present attachment with the elements of standard type employed in connection with the brake mechanism.

The pedal adapted to operate a foot brake on the transmission mechanism of a Ford automobile, is designated 10, and connected therewith is a rod 11' passing through the upper end of the attachment herein disclosed and illustrated especially in Figures 4 and 5. This attachment comprises a bracket 11 having a middle offset portion 13' allowing for the connections positioned opposite this offset portion, as shown in Figure 1.

The bracket 11 is made rigid with reference to arm 13 mounted on transverse control shaft 14', the shaft being adapted to be rocked by the hand lever 14.

Bracket 11 has lower spaced ears 15 passing around shaft 14' and retained by bolt 16, and this bracket is further provided with an upper slotted portion 17, the approximately flat side of which is turned at an angle with reference to the main portion of the bracket, the flat side being engaged by nut 18 on rod 11'. U-bolt 19 passes through bracket 11 and around arm 13 for effecting rigid connection with this element.

The connection between rod 11' and pedal 10 is effected by means of an arm or plate 20 of the form illustrated in Figures 2 and 3, this plate including offset portion 21 having apertures 22, and the plate further including an apertured lower end 23. Ears 24 and 25 are formed at the upper end of element 20, the ears passing around pedal 10. A U-bolt 26 passes around the pedal and through apertures 22 and is properly secured by nuts.

The clutch lever 27 is connected in the usual manner with pedal 28 and this lever carries an adjusting screw cooperating with the free end of arm 13, also in the usual manner.

In view of the mounting of the attachment as disclosed, the operation of lever 14 will directly control the foot brake on the transmission, thereby avoiding the independent operations required in the present car.

Having thus described the invention, what is claimed as new, is:—

In motor car brake mechanism, a foot brake pedal, a hand lever, a control shaft operated by the lever, and means for operating the pedal incident to the operation of the lever and shaft, said means including a bracket, an arm extending from the shaft, the bracket being connected with the arm, and means connecting the bracket with the pedal, said bracket being forked at its lower end and straddling the control shaft, and the bracket being slotted at its upper end, the upper portion being deflected to extend at an angle with reference to the main portion of the bracket and the bracket being curved outwardly at a point intermediate of its ends, the outwardly curved portion and the deflected portion being at approximately right angles, and these portions merging into one another.

In testimony whereof we affix our signatures.

ROBERT A. RICKETTS.
JOE A. BUFFINGTON.